United States Patent
Park et al.

(10) Patent No.: US 9,477,044 B2
(45) Date of Patent: Oct. 25, 2016

(54) 3-DIMENSIONAL OPTICAL INTERCONNECTION STRUCTURE USING BRANCHED WAVEGUIDES

(71) Applicant: Korea Advanced Institute of Science and Technology, Daejeon (KR)

(72) Inventors: Hyo Hoon Park, Daejeon (KR); Jong Hun Kim, Daejeon (KR); Sun Kyu Han, Daejeon (KR)

(73) Assignee: Korea Advanced Institute of Science and Technology (KR)

( * ) Notice: Subject to any disclaimer, the term of this patent is extended or adjusted under 35 U.S.C. 154(b) by 0 days.

(21) Appl. No.: 14/690,105

(22) Filed: Apr. 17, 2015

(65) Prior Publication Data

US 2015/0309256 A1    Oct. 29, 2015

(30) Foreign Application Priority Data

Apr. 25, 2014 (KR) .................. 10-2014-0050297

(51) Int. Cl.
*G02B 6/12* (2006.01)
*G02B 6/28* (2006.01)
*G02B 6/43* (2006.01)

(52) U.S. Cl.
CPC ......... *G02B 6/2804* (2013.01); *G02B 6/12002* (2013.01); *G02B 6/43* (2013.01)

(58) Field of Classification Search
CPC .................. G02B 6/2804; G02B 6/12002
USPC ........................................... 385/14
See application file for complete search history.

(56) References Cited

U.S. PATENT DOCUMENTS

| | | | | |
|---|---|---|---|---|
| 4,742,526 A | * | 5/1988 | Matsui | H01S 5/4068 372/44.01 |
| 4,765,703 A | * | 8/1988 | Suzuki | G02F 1/3137 385/33 |
| 5,123,069 A | * | 6/1992 | Okayama | G02F 1/3137 385/132 |
| 2005/0118740 A1 | * | 6/2005 | Ishikawa | G02B 6/1221 438/31 |

FOREIGN PATENT DOCUMENTS

| | | |
|---|---|---|
| JP | 2004252142 A | 9/2004 |
| KR | 1020100076025 A | 7/2010 |

* cited by examiner

*Primary Examiner* — Jerry Blevins
(74) *Attorney, Agent, or Firm* — Kolisch Hartwell, P.C.

(57) ABSTRACT

A waveguide of a 3D interconnection structure and an optical data bus system of a 3D interconnection structure using the same are provided. The waveguide includes a main waveguide which is formed in a predetermined direction and at least one branch waveguide which connects to the main waveguide to form a predetermined angle, wherein the at least one branch waveguide branches an optical signal, which is propagated in the main waveguide, at a predetermined rate.

10 Claims, 2 Drawing Sheets

3-DIMENSIONAL OPTICAL INTERCONNECTION STRUCTURE USING BRANCHED WAVEGUIDES

CROSS-REFERENCE TO RELATED APPLICATIONS

A claim for priority under 35 U.S.C. §119 is made to Korean Patent Application No. 10-2014-0050297 filed Apr. 25, 2014, in the Korean Intellectual Property Office, the entire contents of which are hereby incorporated by reference.

BACKGROUND

Embodiments of the inventive concepts described herein relate to a 3-dimensional (3D) optical interconnection structure, and more particularly, to a waveguide of a 3D interconnection structure including a main waveguide and branch waveguides which branch an optical signal and power which are propagated in the main waveguide and an optical data bus system of a 3D interconnection structure using the same.

Most data interconnection between multi-chips, such as between a central processing unit (CPU) and a memory, depends on an electric data bus system. However, there is a limit in a signal transmission speed due to serious power dissipation in an electric transmission line and a cross-talk by interference between transmission lines.

To improve this, a conventional optical data bus system using not electric connection but an optical signal is proposed. U.S. Pat. No. 8,526,816 discloses a structure for increasing a signal transmission speed using an optical data bus without interference between channels.

However, the conventional optical data bus system uses a reflector or an optical grating coupler to branch an optical signal. There is a disadvantage in that additional optical loss occurs due to low coupling efficiency and a large alignment error in connection between the optical grating coupler and a waveguide.

It is needed to provide an optical data bus system of a 3D interconnection structure without loss and an alignment error by optical coupling by additionally locating branch waveguides, each of which forms a small angle, on a conventional waveguide.

SUMMARY

Embodiments of the inventive concepts provide an optical data bus system of a 3D interconnection structure which is an optical splitting structure suitable for multi-channel and multi-stage optical signal branch in optical interconnection between multi-chips and does not generate additional optical loss other than optical loss in waveguide branch points in the optical signal branch.

Embodiments of the inventive concepts provide a waveguide of a 3D interconnection structure, including a main waveguide and at least one branch waveguide connected to the main waveguide, and an optical data bus system of a 3D interconnection structure using the same.

One aspect of embodiments of the inventive concept is directed to provide a waveguide of a 3-dimensional interconnection structure. The waveguide may include a main waveguide which is formed in a predetermined direction and at least one branch waveguide which connects to the main waveguide to form a predetermined angle, wherein the at least one branch waveguide branches an optical signal, which is propagated in the main waveguide, at a predetermined rate.

The predetermined rate at which the optical signal is branched may be adjusted based on the predetermined angle at which the at least one branch waveguide connects to the main waveguide.

The at least one branch waveguide may connect to the main waveguide in one of horizontal and vertical directions of the main waveguide to form the predetermined angle.

The main waveguide or the at least one branch waveguide may be made of polymer material and the predetermined angle may be an angle of 20 degree or less.

The main waveguide or the at least one branch waveguide may be made of semiconductor material and the predetermined angle may be an angle of 60 degree or less.

The at least one branch waveguide may connect to the main waveguide and another waveguide, which is different from the at least one branch waveguide, or at least one of at least one chip in at least one of horizontal and vertical directions of the main waveguide.

Another aspect of embodiments of the inventive concept is directed to provide an optical data bus system of a 3-dimensional interconnection structure. The optical data bus system may include a plurality of main waveguides which are formed in a predetermined direction to propagate an optical signal generated from at least one light source, a plurality of branch waveguides which connect to the plurality of main waveguide to form predetermined angles, and a plurality of chips which connect to the plurality of branch waveguides in at least one of horizontal and vertical directions of the plurality of main waveguides, wherein the plurality of branch waveguides branch the optical signal at predetermined rates and transmit the optical signals, which are branched at the predetermined rates, to the plurality of chips.

The predetermined angles at which the plurality of branch waveguides connect to the plurality of main waveguides may be set to be different from or be the same as each other with respect to each of the plurality of main waveguides.

The predetermined rates at which the optical signal is branched may be adjusted based on the predetermined angles at which the plurality of branch waveguides connect to the plurality of main waveguides.

The plurality of branch waveguides may connect to the plurality of main waveguides in one of horizontal and vertical directions of the plurality of main waveguides to form the predetermined angles.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
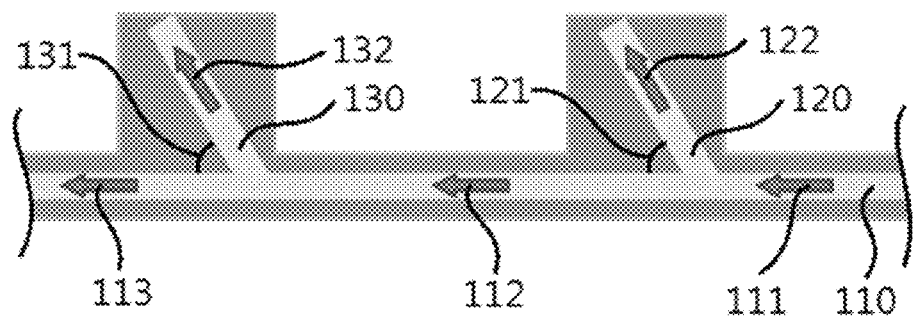
FIG. 1 is a drawing illustrating a waveguide of a 3D interconnection structure according to an exemplary embodiment of the inventive concept.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

Hereinafter, a description will be given in detail for exemplary embodiments of the inventive concept with reference to the accompanying drawings. However, the inventive concept is not limited to exemplary embodiments described below or depicted in the drawings. Also, the same reference numerals shown in each of drawings represents the same members, respectively.

FIG. 1 is a drawing illustrating a waveguide of a 3D interconnection structure according to an exemplary embodiment of the inventive concept. In more detail, FIG. 1 illustrates the waveguide of the 3D interconnection structure in which one optical signal is split into optical signals in multi-stages.

Referring to FIG. 1, the waveguide of the 3D interconnection structure may include a main waveguide 110 and at least one branch waveguide, that is, first and second branch waveguides 120 and 130.

Herein, the main waveguide 110 may split and transmit optical signals 111 to 113 in a predetermined direction by being formed in the predetermined direction. Herein, the main waveguide 110 may propagate the optical signals 111 to 113 by connecting to a light source or at least one of other waveguides in which the optical signals 111 to 113 transmitted from the light source are transmitted.

The at least one branch waveguide 120 and 130 connects to the main waveguide 110 to form each of predetermined angles 121 and 131. Herein, the at least one branch waveguide 120 and 130 may branch the optical signals 111 and 112, which are propagated in the main waveguide 110, at a predetermined rate in stages by connecting to the main waveguide 110 to form each of the predetermined angles 121 and 131.

Accordingly, the predetermined rate at which the optical signals 111 and 112 are branched may be adjusted based on each of the predetermined angles 121 and 131 at which the at least one branch waveguides 120 and 130 connects to the main waveguide 110.

For example, a rate at which the optical signal 111 is split to the first branch waveguide 120 and the main waveguide 110 in a first branch point where the first branch waveguide 120 connects to the main waveguide 110 may be adjusted according to the predetermined angle 121 at which the first branch waveguide 120 connects to the main waveguide 110. Also, a rate at which the optical signal 112 is split to the second branch waveguide 130 and the main waveguide 110 in a second branch point where the second branch waveguide 130 connects to the main waveguide 110 may be adjusted according to the predetermined angle 131 at which the second branch waveguide 130 connects to the main waveguide 110.

In more detail, for example, if the first branch waveguide 120 connects to the main waveguide 110 at an angle of 4 degree, the optical signal 111 input from the light source is branched at a rate of 2 to 1 (the main waveguide 110 to the first branch waveguide 120) in the first branch point where the first branch waveguide 120 connects with the main waveguide 110. Accordingly, the optical signal 112 having an intensity corresponding to a rate of about 66% of the optical signal 111 input from the light source may be propagated in the main waveguide 110 after the first branch point. Also, a first optical signal 122 having an intensity corresponding to a rate of about 33% of the optical signal 111 input from the light source may be propagated in the first branch waveguide 120. Thereafter, if the second branch waveguide 130 connects to the main waveguide 110 at a smaller angle than that of the first branch point, the optical signal 112 which is propagated in the main waveguide 110 after the first branch point is branched at a rate of 1 to 1 (the main waveguide 110 to the second branch waveguide 130) in the second branch point where the second branch waveguide 130 connects with the main waveguide 110. Accordingly, the optical signal 113 having an intensity corresponding to a rate of about 33% of the optical signal 111 before the first branch point may be propagated in the main waveguide 110 after the second branch point. Also, a second optical signal 132 having an intensity corresponding to a rate of about 33% of the optical signal 111 before the first branch point may be propagated in the second branch waveguide 130. The optical signal 111 which is propagated in the main waveguide 110 may be split into the optical signals 122, 132, and 113 having the same level in three directions therefrom.

As such, the predetermined angle 121 at which the first branch waveguide 120 connects to the main waveguide 110 may be determined according to a rate between the first optical signal 122 to be propagated in the first branch waveguide 120 and the optical signal 112 to be propagated in the main waveguide 110 after the first branch point. Also, the predetermined angle 131 at which the second branch waveguide 130 connects to the main waveguide 110 may be determined according to a rate between the second optical signal 132 to be propagated in the second branch waveguide 130 and the optical signal 113 to be propagated in the main waveguide 110 after the second branch point. Herein, the intensity of each of the optical signals 122 and 132, which are branched to the first branch waveguide 120 and the second branch waveguide 130, respectively, may be determined according to predetermined intensity which may be recognized by a photodetector. For example, the optical signals 122 and 132 may be branched to the first branch waveguide 120 and the second branch waveguide 130, respectively, such that the intensity of each of the optical signals 122 and 132 which are branched to the first branch waveguide 120 and the second branch waveguide 130, respectively, is stronger than the predetermined intensity which may be recognized by the photodetector.

Also, the at least one branch waveguide 120 and 130 may connect to the main waveguide 110 in at least one of horizontal and vertical directions of the main waveguide 110 to form each of the predetermined angles 121 and 131. For example, the at least one branch waveguide 120 and 130 may connect to the main waveguide 110 in the horizontal direction (2D) of the main waveguide 110 to be located on the one plane with the main waveguide 110. In this case, FIG. 1 may be a drawing illustrating a top view of a waveguide of a 3D interconnection structure. On the other hand, the at least one branch waveguide 120 and 130 may connect to the main waveguide 110 in the vertical direction (3D) of the main waveguide 110. In this case, FIG. 1 may be a drawing illustrating a side view of a waveguide of a 3D interconnection structure.

Also, the predetermined angles 121 and 131 at which the at least one branch waveguide 120 and 130 connects with the main waveguide 110 may be determined as a variety of angles according to a structure, a refractive index distribution, and an optical mode distribution of the main waveguide 110 to use characteristics in which the optical signals 111 and 112 which are propagated in the main waveguide 110 are evanescent-wave-coupled to light output to the at least one branch waveguide 120 and 130. For example, if core and clad material of each of the main waveguide 110 and the at least one branch waveguide 120 and 130 is typically used polymer material (its refractive index is usually about 1.3 to 1.7), when an optical signal of a single transverse mode is transmitted, an angle of the at least one branch waveguide 120 and 130 may be an angle of 20 degree or less. If core material of each of the main waveguide 110 and the at least one branch waveguide 120 and 130 is semiconductor material (its refractive index about 3 to 4) such as silicon, and if clad material thereof is a medium such as air, silicon oxide, or silicon nitride (its refractive index is usually about 1 to 2), when an optical signal of a single transverse mode is transmitted, an angle of the at least one branch waveguide 120 and 130 may be an angle of 60 degree or less.

Also, at least one chip may connect to the at least one branch waveguide 120 and 130 in at least one of the horizontal and vertical directions of the main waveguide 110. Therefore, an optical data bus system of a 3D interconnection structure may be configured using the above-described waveguide of the 3D interconnection structure. A description will be given below in detail for this.

Figure 2:
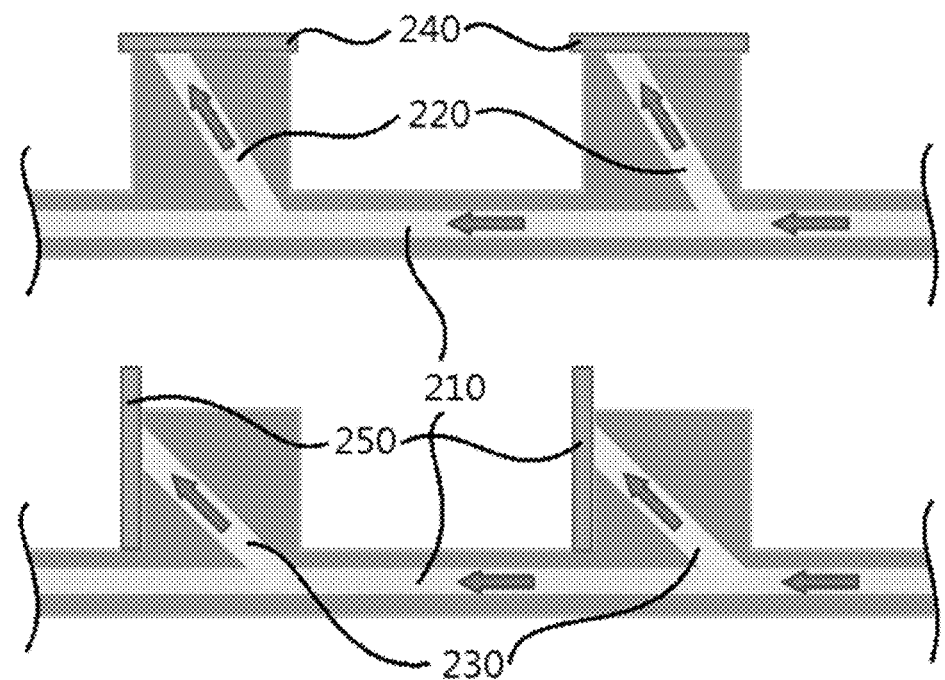
FIG. 2 is a drawing illustrating a waveguide of a 3D interconnection structure and chips connected to the waveguide according to an exemplary embodiment of the inventive concept.

FIG. 2 is a drawing illustrating a waveguide of a 3D interconnection structure and chips connected to the waveguide according to an exemplary embodiment of the inventive concept.

Referring to FIG. 2, chips 240 and 250 may connect to at least one branch waveguide 220 and 230, which is included in the waveguide of the 3D interconnection structure according to an exemplary embodiment of the inventive concept, in at least one of horizontal and vertical directions of a main waveguide 210 in stages.

For example, in case of the waveguide of the 3D interconnection structure in which the chips 240 connect thereto horizontally, the chips 240 may connect to the at least one branch waveguide 220 in the horizontal direction of the main waveguide 210. On the other hand, in case of the waveguide of the 3D interconnection structure in which the chips 250 connect thereto vertically, the chips 250 may connect to the at least one branch waveguide 230 in the vertical direction of the main waveguide 210.

Herein, optical signals which are propagated in the at least one branch waveguide 220 and 230 after an optical signal which is propagated in the main waveguide 210 is branched may be transmitted to the chips 240 and 250.

Also, although it is not shown in FIG. 2, the main waveguide 210 and other waveguides which are different from the at least one branch waveguide 220 and 230 may connect to the at least one branch waveguide 220 and 230 according to an exemplary embodiment of the inventive concept.

Figure 3:
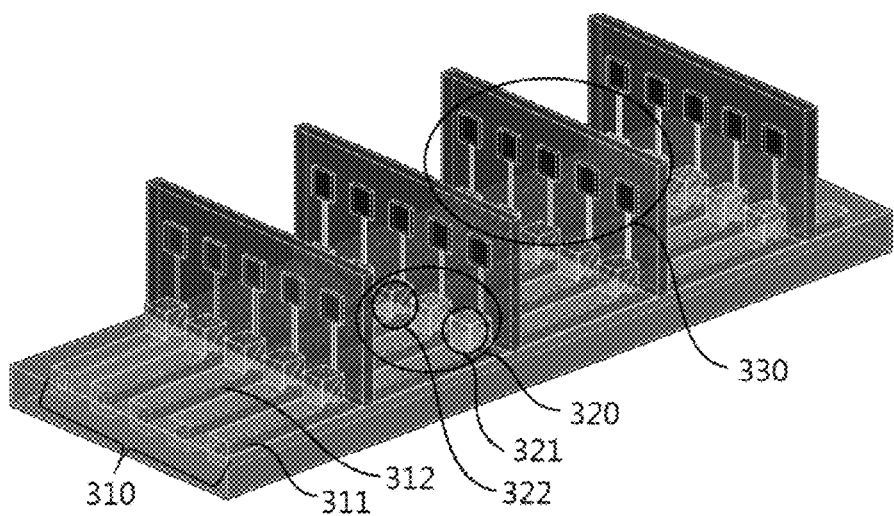
FIG. 3 is a pictorial drawing illustrating an optical data bus system of a 3D interconnection structure according to an exemplary embodiment of the inventive concept.

FIG. 3 is a pictorial drawing illustrating an optical data bus system of a 3D interconnection structure according to an exemplary embodiment of the inventive concept. In more detail, FIG. 3 illustrates a 3D structure of an optical data bus system of a multi-channel and multi-stage 3D interconnection structure.

Referring to FIG. 3, the optical data bus system of the 3D interconnection structure according to an exemplary embodiment of the inventive concept may include a plurality of main waveguides 310 which connect in parallel, a plurality of branch waveguides 320, and a plurality of chips 330.

Herein, each of the plurality of main waveguides 310 may be formed in a predetermined direction to propagate an optical signal, which is generated from at least one light source, in parallel.

The plurality of branch waveguides 320 may branch optical signals, each of which is propagated in corresponding one of the plurality of main waveguides 310, at predetermined rates by connecting to the plurality of main waveguides 310 to form predetermined angles. Herein, the plurality of branch waveguides 320 may connect to the plurality of main waveguides 310 in at least one of horizontal and vertical directions of the plurality of main waveguides 310 to form predetermined angles.

For example, the plurality of branch waveguides 320 may connect to the plurality of main waveguides 310 in the horizontal direction (2D) of the plurality of main waveguides 310 to be located with the plurality of main waveguides 310 on the same plane. Also, the plurality of branch waveguides 320 may connect to the plurality of main waveguides 310 in the vertical direction (3D) of the plurality of main waveguides 310. FIG. 3 illustrates when the plurality of branch waveguides 320 connect to the plurality of main waveguides 310 in the vertical direction of the plurality of main waveguides 310.

The plurality of chips 330 may connect to the plurality of branch waveguides 320 in at least one of the horizontal and vertical directions of the plurality of main waveguides 310. Accordingly, optical signals which are branched at predetermined rates by the plurality of branch waveguides 320 may be transmitted to the plurality of chips 330. Herein, the plurality of chips 330 may be configured as a chipset.

Also, as predetermined rates at which optical signals are branched in branch points where the plurality of branch waveguides 320 connect with the plurality of main waveguides 310 may be adjusted based on predetermined angles at which the plurality of branch waveguides 320 connect to the plurality of main waveguides 310, optical signals transmitted to the plurality of chips 330 may also be controlled. Herein, the predetermined angles at which the plurality of branch waveguides 320 connect to the plurality of main waveguides 310 may be determined as a variety of angles according to structures, refractive index distributions, and optical mode distributions of the plurality of main waveguides 310 to use characteristics in which the optical signals which are propagated in the plurality of main waveguides 310 are evanescent-wave-coupled to light output to the plurality of branch waveguides 320. For example, if core and clad material of each of the plurality of main waveguides 310 and each of the plurality of branch waveguides 320 is typically used polymer material (its refractive index is 1.3 to 1.7), when an optical signal of a single transverse mode is transmitted, an angle of each of the plurality of branch waveguides 320 may be an angle of 20 degree or less. If core material of each of the plurality of main waveguides 310 and each of the plurality of branch waveguides 320 is semiconductor material (its refractive index 3 to 4) such as silicon, and if clad material thereof is a medium such as air, silicon oxide, or silicon nitride (its refractive index is 1 to 2), when an optical signal of a single transverse mode is transmitted, each of the plurality of branch waveguides 320 may be an angle of 60 degree or less.

Herein, the predetermined angles at which the plurality of branch waveguides 320 connect to the plurality of main waveguides 310 may be set to be different from or be the same as each other with respect to each of the plurality of main waveguides 310 to adjust rates at which optical signals are branched. For example, a predetermined angle at which a first branch waveguide 321 connects to a first main waveguide 311 may be different from or be the same as a predetermined angle at which a third branch waveguide 322 connects to a third main waveguide 312. Accordingly, optical signals transmitted to chips connected to the plurality of branch waveguides 320 may be different from each other or be the same as each other.

Also, when other branch waveguides connects to the first main waveguide 311 in addition to the first branch waveguide 321, the predetermined angle at which the first branch waveguide 321 connects to the first main waveguide 311 may be different from or be the same as predetermined angles at which the other branch waveguides other than the first branch waveguide 321 connect to the first main waveguide 311. A description will be given in detail for this with reference to FIG. 4.

Figure 4:
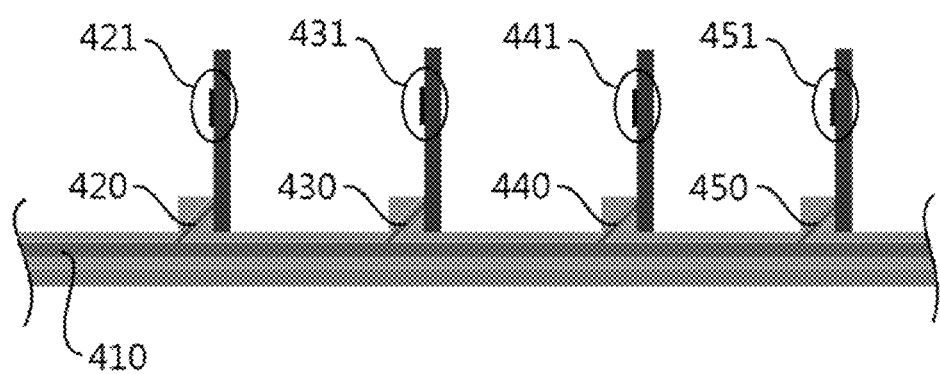
FIG. 4 is a side cross-sectional view illustrating an optical data bus system which is connected from a first main waveguide and branch waveguides of the first main waveguide, which are shown in FIG. 3, according to an exemplary embodiment of the inventive concept.

FIG. 4 is a side cross-sectional view illustrating an optical data bus system which is connected from a first main waveguide and branch waveguides of the first main waveguide, which are shown in FIG. 3, according to an exemplary embodiment of the inventive concept.

Referring to FIG. 4, a plurality of branch waveguides, that is, first to fourth branch waveguides 420, 430, 440, and 450 may connect to a first main waveguide 410 according to an exemplary embodiment of the inventive concept.

For example, each of the first branch waveguide 420, the second branch waveguide 430, the third branch waveguide 440, and the fourth branch waveguide 450 may connect to the first main waveguide 410 to form a predetermined angle.

Herein, an angle of the first branch waveguide 420 connected to the first main waveguide 410, an angle of the second branch waveguide 430 connected to the first main waveguide 410, an angle of the third branch waveguide 440 connected to the first main waveguide 410, and an angle of the fourth branch waveguide 450 connected to the first main waveguide 410 may be different from or be the same as each other to adjust rates at which optical signals are branched.

Therefore, an optical signal transmitted to a first chip 421 connected to the first branch waveguide 420, an optical signal transmitted to a second chip 431 connected to the second branch waveguide 430, an optical signal transmitted to a third chip 441 connected to the third branch waveguide 440, and an optical signal transmitted to a fourth chip 451 connected to the first branch waveguide 450 may be different from or be the same as each other.

Therefore, the optical data bus system of the 3D interconnection structure according to exemplary embodiments of the inventive concept which may be an optical splitting structure suitable for multi-channel and multi-stage optical signal branch in optical interconnection between multi-chips and may not generate additional optical loss other than optical loss in waveguide branch points in the optical signal branch.

Also, the waveguide of the 3D interconnection structure and the optical data bus system of the 3D interconnection structure using the same according to exemplary embodiments of the inventive concept may include the main waveguide and the at least one branch waveguide connected to the main waveguide.

Also, the waveguide of the 3D interconnection structure and the optical data bus system of the 3D interconnection structure using the same according to exemplary embodiments of the inventive concept may branch the optical signal, which is propagated in the main waveguide, at the predetermined rate by connecting the at least one branch waveguide to the main waveguide to form the predetermined rate.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. A waveguide of a 3-dimensional interconnection structure, comprising:
   a main waveguide which is formed in a predetermined direction; and
   at least one branch waveguide which connects to the main waveguide to form a predetermined angle,
   wherein the at least one branch waveguide branches an optical signal, which is propagated in the main waveguide, at a predetermined rate, and
   wherein the predetermined angle at which the at least one branch waveguide connects with the main waveguide is determined according to a structure, a refractive index distribution, and an optical mode distribution of the main waveguide to use characteristics in which the optical signal which is propagated in the main waveguide is evanescent-wave-coupled to light output to the at least one branch waveguide.

2. The waveguide of claim 1, wherein the predetermined rate at which the optical signal is branched is adjusted based on the predetermined angle at which the at least one branch waveguide connects to the main waveguide.

3. The waveguide of claim 1, wherein the at least one branch waveguide connects to the main waveguide in one of horizontal and vertical directions of the main waveguide to form the predetermined angle.

4. The waveguide of claim 1, wherein the main waveguide or the at least one branch waveguide is made of polymer material, and
   wherein the predetermined angle is an angle of 20 degree or less.

5. The waveguide of claim 1, wherein the main waveguide or the at least one branch waveguide is made of semiconductor material, and
   wherein the predetermined angle is an angle of 60 degree or less.

6. The waveguide of claim 1, wherein the at least one branch waveguide connects to the main waveguide and another waveguide, which is different from the at least one branch waveguide, or at least one of at least one chip in at least one of horizontal and vertical directions of the main waveguide.

7. An optical data bus system of a 3-dimensional interconnection structure, comprising:
 a plurality of main waveguides which are formed in a predetermined direction to propagate an optical signal generated from at least one light source;
 a plurality of branch waveguides which connect to the plurality of main waveguide to form predetermined angles; and
 a plurality of chips which connect to the plurality of branch waveguides in at least one of horizontal and vertical directions of the plurality of main waveguides,
 wherein the plurality of branch waveguides branch the optical signal at predetermined rates and transmit the optical signals, which are branched at the predetermined rates, to the plurality of chips, and
 wherein the predetermined angle at which the at least one branch waveguide connects with the main waveguide is determined according to a structure, a refractive index distribution, and an optical mode distribution of the main waveguide to use characteristics in which the optical signal which is propagated in the main waveguide is evanescent-wave-coupled to light output to the at least one branch waveguide.

8. The optical data bus system of claim 7, wherein the predetermined angles at which the plurality of branch waveguides connect to the plurality of main waveguides are set to be different from or be the same as each other with respect to each of the plurality of main waveguides.

9. The optical data bus system of claim 8, wherein the predetermined rates at which the optical signal is branched are adjusted based on the predetermined angles at which the plurality of branch waveguides connect to the plurality of main waveguides.

10. The optical data bus system of claim 8, wherein the plurality of branch waveguides connect to the plurality of main waveguides in one of horizontal and vertical directions of the plurality of main waveguides to form the predetermined angles.

* * * * *